United States Patent [19]

Curry

[11] 4,199,179
[45] Apr. 22, 1980

[54] SPRING BIASED PROP FOR A PIVOTED MEMBER HINGED TO A SUPPORT MEMBER

[75] Inventor: Miles K. Curry, Niles, Mich.

[73] Assignee: Coachmen Industries, Inc., Middlebury, Ind.

[21] Appl. No.: 864,666

[22] Filed: Dec. 27, 1977

[51] Int. Cl.² ............................................. E05C 17/30
[52] U.S. Cl. ............................... 292/338; 403/56; 403/166
[58] Field of Search ................ 292/338, 262, 339; 403/166, 144, 56, 104

[56] References Cited
U.S. PATENT DOCUMENTS

| 180,881 | 8/1876 | Howson | 403/56 |
|---|---|---|---|
| 1,330,363 | 2/1920 | Whitt | 403/166 X |
| 1,923,972 | 8/1933 | Goodykoontz | 403/144 X |
| 2,073,149 | 3/1937 | Geyer | 292/DIG. 38 |
| 2,141,945 | 12/1938 | Tweedale | 403/56 X |
| 3,367,616 | 2/1968 | Bausch et al. | 403/56 X |
| 3,851,907 | 12/1974 | Sandor | 292/338 X |

*Primary Examiner*—Richard E. Moore
*Attorney, Agent, or Firm*—Oltsch, Knoblock & Hall

[57] ABSTRACT

A spring biased prop for use with a pivot member, such as a window, hinged to a support member. The prop includes sliding tubular telescopic members each carrying a pivoted arm part for attachment to the pivot member or support member. A sleeve formed of generally friction free material, such as nylon or Teflon, is fitted between the tubular members to accommodate sliding movement of the members relative to each other.

1 Claim, 6 Drawing Figures

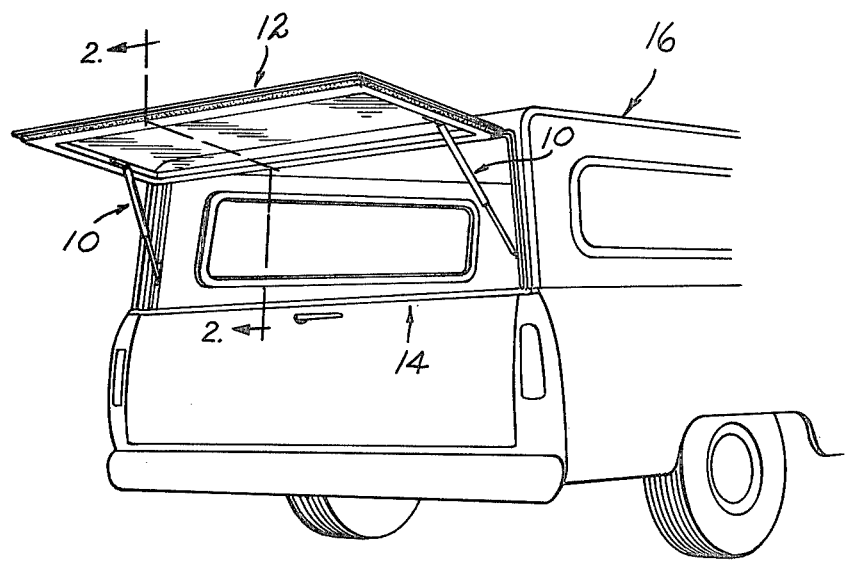
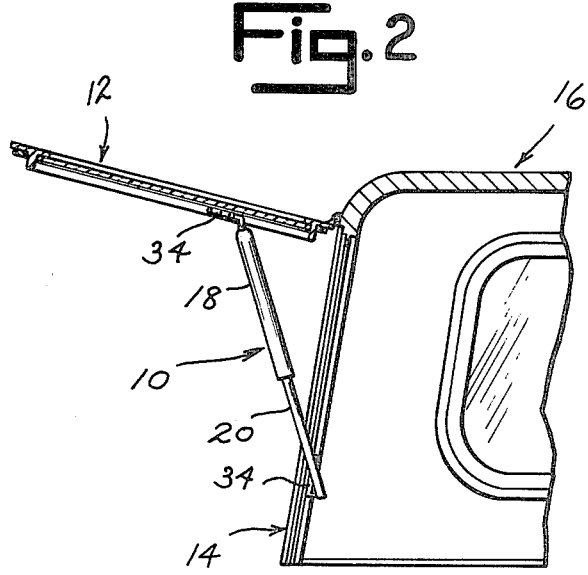
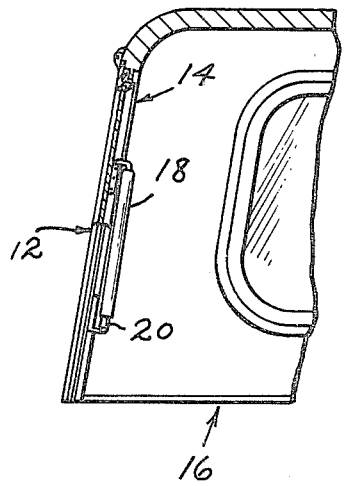

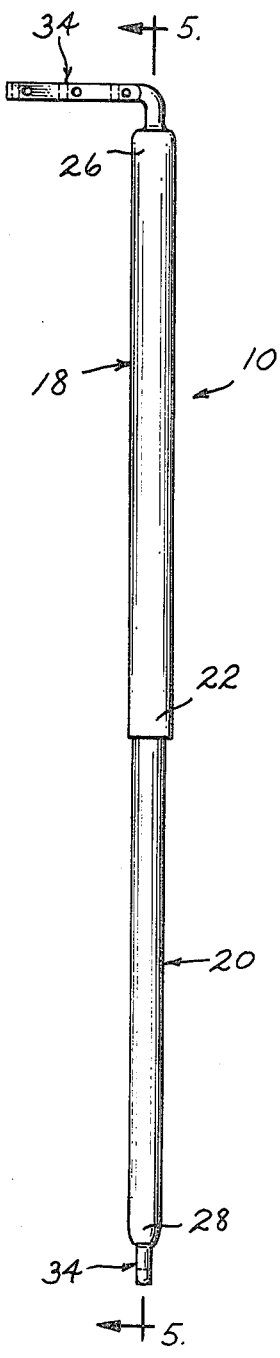
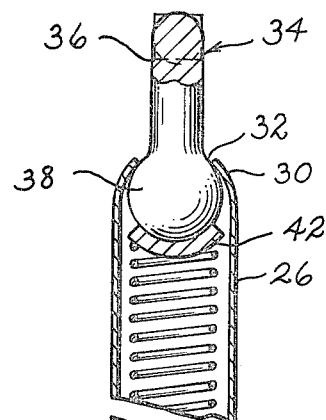
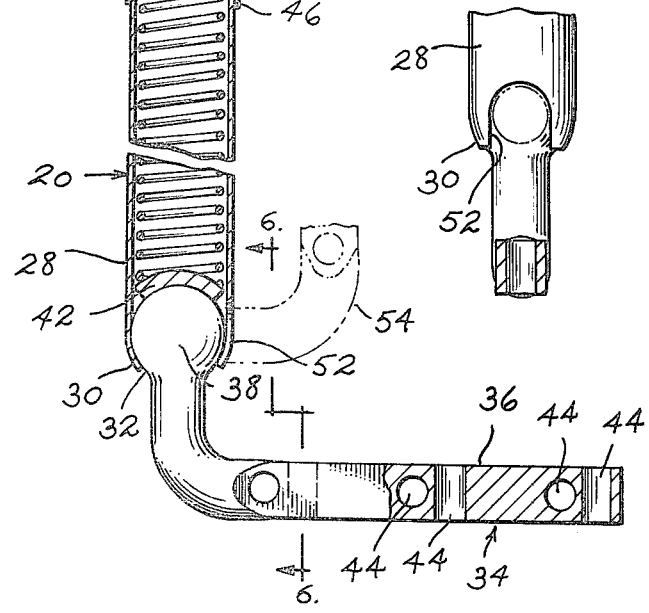

SPRING BIASED PROP FOR A PIVOTED MEMBER HINGED TO A SUPPORT MEMBER

SUMMARY OF THE INVENTION

This invention relates to a prop for providing opening movement of a pivot member, such as a window, hinged to a support member.

The prop of this invention includes spring biased sliding tubular telescopic members which carry pivoted arm parts adapted for connection to a hinged pivot member and a support member. The pivot connection of each arm part to its respective tubular member allows the arm part to be rotated 360° in a universal movement to accommodate a high degree of freedom in mounting the prop between the hinged pivot and support members. Further, the construction of the arm parts reduces the possibility of binding of the prop during opening and closing movement of the pivot member.

A sleeve formed of generally friction free material, such as nylon or Teflon, is located between the tubular members of the prop for the purpose of reducing frictional contact between tubular members during expansion and retraction of the prop.

It is an object of this invention to provide a prop having spring loaded telescopic members carrying pivotally mounted arm parts for versatile connection between a pivot member hinged to a support member.

Another object of this invention is to provide a prop for opening a pivot member hinged to a support member and having inner and outer telescopic interfitting tubular members which are spring biased into a normally extended position and which include pivotally connected arm parts for attachment to the pivot and support members.

Still another object of this invention is to provide a prop which is for opening a pivoted member, such as a window, hinged to a support member and which is of essentially friction free operation.

Other objects of this invention will become apparent upon a reading of the invention's description.

BRIEF DESCRIPTION OF THE DRAWINGS

A preferred embodiment of this invention has been chosen for purposes of illustration and description wherein:

FIG. 1 is a fragmentary perspective view of a vehicle showing the prop of this invention supportingly extending between an open window hinged to a window frame.

FIG. 2 is a fragmentary sectional view taken along line 2—2 of FIG. 1.

FIG. 3 is a fragmentary sectional view like FIG. 2 but showing the window of the vehicle in its closed position.

FIG. 4 is an elevational view of the prop of this invention.

FIG. 5 is a fragmentary detailed sectional view taken along line 5—5 of FIG. 4 showing one arm part of the prop in a broken line alternate position.

FIG. 6 is a fragmentary sectional view taken along line 6—6 of FIG. 5.

DESCRIPTION OF THE PREFERRED EMBODIMENT

The preferred embodiment illustrated is not intended to be exhaustive or to limit the invention to the precise form disclosed. It has been chosen and described in order to best explain the principles of the invention and its application and practical use to thereby enable others skilled in the art to best utilize the invention.

In FIG. 1 a pair of props 10 is shown connected between a window 12 and a window frame 14. Window 12 is hinged to frame 14 and constitutes a part of the illustrated vehicle 16. Referring now to FIGS. 4–6, each prop 10 includes an outer tubular member 18 and an inner tubular member 20. Tubular member 20 fits telescopically within tubular member 18 with the inner end portions 22 and 24 of the tubular members overlapping in a slidable relationship. The outer end portion 26 of tubular member 18 and the outer end portion 28 of tubular member 20 include arcuately inturned end edges 30 which define restricted openings 32 into the tubular members.

An arm part 34 is secured to each tubular member 18 and 20 at its outer end portion 26 and 28.

Each arm part 34 includes a shank 36 which terminates in a sperical enlarged end 38 and is connected to a tubular member 18,20 by having its shank 36 extended through opening 32 in the tubular member. The enlarged end 38 of each arm part 34 has a diameter exceeding the diameter of the tubular opening 32 through which its shank 36 extends. A helical spring 40 is located within the interfitting tubular members 18 and 20 and includes at each end an arcuate bearing member 42. Spring 40 is placed in compression so as to urge its bearing members 42 against enlarged ends 38 of the arm parts 34 to cause the arm part ends to be forced into abutment with end edges 30 of tubular members 18 and 20.

Opening 32 in each tubular member 18 and 20 is sufficiently larger than the diameter of shank 36 of each arm part 34 next to its enlarged end 38 to permit unrestricted 360 degree pivotal movement of the arm part in one plane and limited pivotal movement of the arm part in other perpendicularly oriented planes. By providing arm parts 34 with spherical ends 38, each arm part is able to experience universal movement relative to its connected tubular member 18,20.

Shank 36 of each arm part 34 is preferably provided with a right angular bend. A plurality of holes 44, preferably paired in transverse oriented relationships, are formed in each arm part shank 36 to enable the arm part in its bent form to be secured to window 12 or frame 14 by screws (not shown) or similar attachment means. A sleeve 46 formed of nylon, Teflon or similar generally friction-free material is inserted into inner end portion 22 of tubular member 18 and positioned between tubular member 20 and tubular member 18. Sleeve 46 is secured by a bonding material to the inner surface of tubular member 18 and serves to provide a bearing surface for tubular member 20 as the tubular members are extended and retracted. An outturned flange 48 is formed at the end of inner end portion 24 of tubular member 20. Flange 48 preferably has a diameter which is slightly less than the inner diameter of tubular member 18 and serves to make abutting contact with the inner end edge 50 of sleeve 46 when the tubular members are fully extended, thus providing a stop which prevents separation of the tubular members. It is to be understood that in some embodiments of this invention it may not be necessary to incorporate flange 48 as a stop due to the type of installation of prop 10. This could occur when the pivot member, such as window 12, would have only limited opening movement in which case the prop would not become fully extended.

In FIG. 1 a pair of props 10 is shown secured between window 12 and frame 14 for the purpose of supporting the window in its open position as better shown in FIG. 2. In FIG. 3 window 12 is shown in its closed position with tubular members 18 and 20 in their retracted position, causing full compression of spring 40 within each of the props 10. Spherical ends 38 of arm parts 34 allow each of the arm parts to experience universal swiveling movement relative to its connected tubular member 18,20. This allows for ease of attachment of prop 10 as well as non-binding operation of the prop during opening and closing movement of its connected pivot member.

Additionally, each end portion 26 and 28 of tubular members 18 and 20 may be provided with a slot 52 which interrupts end edge 30 of the tubular members. Each slot 52 preferably has a width which just slightly exceeds the diameter of arm part shank 36 and is formed for the purpose of accommodating extended pivotal movement of the arm part relative to its connected tubular member as illustrated by broken lines 54 in FIG. 5.

It is to be understood that the invention above described is not to be limited by the details given but may be modified within the scope of the appended claims.

What I claim is:

1. A prop for use with a pivot member hinged to a support member, said prop having an inner tubular member and an outer tubular member, the inner of said tubular members fitting telescopically in a slidable relationship into the outer of said tubular members, the terminal ends of said telescopically fitting tubular members being arcuately constricted in diameter, the terminal ends of said tubular members terminating in an inturned edge to provide openings into said tubular members of a diameter less than the internal diameter of the tubular members, each tubular member having an end edge oppositely located from its said terminal end, two arm parts each including a shank terminating in an enlarged spherical end, said arm parts adapted for connection at their shank to said pivot member and support member, said shank of said one arm part extending with clearance through the terminal opening in said one tubular member with said enlarged spherical end fitting within said tubular member terminal end, said shank of said other arm part extending with clearance through the terminal opening in said other tubular member with said enlarged spherical end fitting within said tubular member terminal end, a helical compression spring positioned within and in association with said tubular members for biasing said tubular members toward an extended position, each end of said spring contacting an arcuate disk, said arcuate disk being interposed between the end of its contacting spring and the enlarged spherical end of an arm part to urge said arm part into slidable contact with the internal surface of the terminal end of the tubular member receiving said arm part, said inner tubular member having an outturned flange formed at its end edge, said flange extending to adjacent the inner surface of said outer tubular member, a slot formed in each of the terminal ends of said tubular members interrupting the said inturned edges, said slots for receiving the shanks of said arm parts to accommodate angular pivoted movement of said arm parts relative to said tubular members, a sleeve formed of a material providing a low coefficient of static friction, said sleeve being bonded to the inner surface of said outer tubular member adjacent its end edge, said sleeve having an inner end edge, said sleeve inner end edge engaging the outturned flange of said inner tubular member upon full extension of the tubular members wherein said engagement prevents separation of said tubular members, said sleeve forming a bearing surface to accommodate sliding movement of the said inner tubular member within the said outer tubular member.

* * * * *